US007032033B1

(12) United States Patent
Ledoux et al.

(10) Patent No.: US 7,032,033 B1
(45) Date of Patent: Apr. 18, 2006

(54) HANDLING COLLISIONS DURING SYNCHRONIZATION OF DATA BETWEEN CLIENT AND SERVER COMPUTERS

(75) Inventors: Eric Ledoux, Bellevue, WA (US); Paul L. Kollmorgen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 09/997,801

(22) Filed: Nov. 30, 2001

(51) Int. Cl.
*G06F 15/16* (2006.01)
*G06F 12/00* (2006.01)
(52) U.S. Cl. .................. 709/248; 707/203; 711/141
(58) Field of Classification Search .......... 709/248, 709/203, 205; 707/203, 201; 711/141, 122
See application file for complete search history.

(56) References Cited

U.S. PATENT DOCUMENTS

| 5,481,722 | A  | * | 1/1996  | Skinner .................. 717/122 |
| 6,067,551 | A  | * | 5/2000  | Brown et al. ............. 707/203 |
| 6,321,236 | B1 | * | 11/2001 | Zollinger et al. .......... 707/203 |
| 6,341,291 | B1 | * | 1/2002  | Bentley et al. ............ 707/203 |
| 6,460,051 | B1 | * | 10/2002 | LaRue et al. ............. 707/201 |
| 6,578,054 | B1 | * | 6/2003  | Hopmann et al. .......... 707/201 |
| 6,631,386 | B1 | * | 10/2003 | Arun et al. ............... 707/203 |
| 6,694,336 | B1 | * | 2/2004  | Multer et al. ............. 707/201 |

OTHER PUBLICATIONS

Takahara, A.; "Versioning and concurrency control in a distributed design environment" Computer Design: VLSI in Computers and Processors, 1992. ICCD '92. Proceedings., IEEE 1992 International Conference on, Oct. 11-14, 1992 pp.:540-543.*
Onoma, A.K. et al.; "Opusdei-integrated environment for software development and maintenance" Computer Software and Applications, 1996. COMPSAC '96., Proceedings of 20th International, Aug. 21-23, 1996 pp.:516-521.*
Ambriola, V.; Bendix, L.; Ciancarini, P.; "The evolution of configuration management and version control" Software Engineering Journal, vol.: 5, Issue: 6, Nov. 1990 pp.:303-310.*

* cited by examiner

*Primary Examiner*—Marc D. Thompson
*Assistant Examiner*—Tam T. Phan
(74) *Attorney, Agent, or Firm*—Robert M. Anderson (57) ABSTRACT

Data stored on a server are synchronized with corresponding data on a plurality of client computers. To facilitate synchronization of the data, the data for a class of nodes on the server are provided with a version identifier (a serial number) that is incremented each time the data are modified on the server. During synchronization, the version identifier for the data stored on the client is transferred to the server, and the nodes stored on the client are updated by downloading nodes modified on the server since the last synchronization. Data on the client that have been modified are then uploaded to the server. Collisions between nodes of the data that have been modified on two different clients are detected, and a user is given an opportunity to resolve a collision.

34 Claims, 6 Drawing Sheets

HANDLING COLLISIONS DURING SYNCHRONIZATION OF DATA BETWEEN CLIENT AND SERVER COMPUTERS

FIELD OF THE INVENTION

This invention generally relates to synchronization of data maintained in a central storage with changes made in downloaded copies of the data, and more specifically, to synchronization of the data on a server in regard to changes made in the data on client computers that are periodically connected to the server, to resolve conflicts in the data occurring as a result of the changes.

BACKGROUND OF THE INVENTION

There are numerous situations in which it is important to synchronize data that can be downloaded from a server and modified by more than one person or on more than one computer. Each person having access to the data can make changes that may be inconsistent with each other, causing errors in the data when the versions of the data that include these inconsistent changes are uploaded to the server. For example, a person who has downloaded data may add elements to the data and upload the modified data to the server. However, those modifications may be overwritten when another person uploads a different version of the data to the server. Relatively complicated software products have been developed to prevent such scenarios from occurring. Such software products are often used by groups of programmers who are cooperatively developing software to avoid conflicts as different portions of complex software code are written and then modified by different program developers. For example, Microsoft Corporation includes a Visual Sourcesafe™ program with its software development suite, Visual Studio™ that enables developers to "check out" source code files, and when the files are "checked in," merges changes made by all of the users who have checked out the files, by comparing all versions of each file. However, there are many instances when a simpler approach to preventing conflicts and synchronizing the data modified by multiple users that does not merge changes by different users would be beneficial.

While many other types of data might benefit from a simple program to ensure synchronization of the data on the server and the data downloaded and modified by a plurality of users, an excellent example of such an application arises in connection with data stored on Microsoft Corporation's Encarta Class Server (ECS), which starting with version 2.0, will be sold under the trademark Class Server™. The ECS is a client/server product that was developed for use in kindergarten through twelfth grade schools (K–12) to manage distribution, collection, and grading of electronic school work, or "assignments." Students access the ECS using a Web interface. Teachers access ECS using the ECS teacher client (TC), which is also known as Class Server-Teacher. Using TC, a teacher can assign an assignment to students; once the assignment has been completed by students, the teacher can grade each student's electronic work product (called a "paper") for that assignment. Finally, students can view their graded papers. More information about the ECS is available on the Internet at the Web site http://ECS.msn.com/.

Teachers can use TC to create assignments and grade papers remotely over the Internet (e.g., while the teacher is working at home), or can work offline, i.e., while not connected to an intranet or the Internet. When the teacher reconnects to the network, it is important that the TC synchronize the upload to the ECS of any changes (to assignments and papers) that the teacher made, and download any new or modified assignments as well as papers completed by students. The ECS must allow teachers to collaborate. For example, while working offline at home, a teacher should be able to create an assignment, while a teaching assistant grades papers at school. When either the teacher or teaching assistant clicks a synchronize button in the TC, that person should receive the changes made by the other during the synchronization, and changes made by the teacher should then be uploaded to the ECS.

Accordingly, it is important that assignments and papers be synchronized between client and server, and that collisions between modified data be detected and resolved. Collisions can occur if two teachers change the same assignment at the same time. The synchronization process should be incremental, requiring only data transfer of information that has changed since the last synchronization occurred. A program that can provide such functionality will thus be broadly applicable to other types of data and other applications in which data synchronization is important.

SUMMARY OF THE INVENTION

The present invention is directed to a method for maintaining synchronization of data stored on a server where the data are accessible by a plurality of clients. The clients can be coupled in communication with the server or can operate offline. When the clients are coupled to the server, they can download data from the server so that a user can modify the data on the client. Changes to the data made on the client can also be uploaded to the server. The data include a plurality of nodes; a node is at an atomic level, i.e., a node is the smallest data element that can be synchronized as a unit in accord with the present invention. In the example that is discussed below, nodes correspond to class assignments that are created and can be modified by teachers using client computers, either at home or at school. However, the present invention is not limited to the specific exemplary application discussed below, and it should be understood that nodes can be other kinds of data. Also, in the exemplary application discussed below, nodes are grouped together for each class taught by a teacher. However, in a more general sense, the term "class" as used herein has a much broader meaning and is intended to refer to an atomic level within which nodes are grouped for purposes of synchronization, i.e., a class is a set of nodes to which synchronization between a server and client computers is applied, in accord with the present invention.

A version identifier (positive integer) is assigned to a class comprising the nodes on a server. More importantly, the data comprising the nodes for a class stored on the server has a version identifier that is incremented each time any node of the data for that class is modified on the server (preferably, before data on the server are actually changed to include the modified node). The new version identifier class (that was just incremented) is then associated with the modified node in the data for the class on the server. In addition, a "node deleted" version identifier is associated with the data in the class, and has the value of the version identifier that was assigned to the data when a node was last deleted on the server.

When synchronizing data on the client and data on the server for a class, nodes that have been modified on the server since the nodes were previously downloaded by a client will be downloaded to the client to update the client's cache of the data. Also, nodes that were previously downloaded from the server by a client and subsequently modified on the client will be uploaded to the server, so that the changes in the modified node are then available to the next client synchronizing with the server. Similarly, nodes that were newly created by a client are uploaded to the server.

During the synchronization process, the present invention provides for detecting any "collision" occurring between a node that has just been downloaded from the server to a client and a corresponding node that was previously downloaded and modified on the client. A collision occurs when a node was modified by two clients, both starting from the same version of the node downloaded from the server, and an attempt is made to synchronize with server by uploading the nodes that were modified. The collision occurs during the second client's attempt to synchronize. A "proactive collision" is detected during the download from the server of a node that was modified previously by another party, where the downloaded node corresponds to a node that was modified on the client since a previous synchronization by the client occurred. The differences in the version identifiers of the two corresponding nodes enables the client to detect a proactive collision. If a proactive collision is detected, the user of the client is alerted. A reactive collision is detected during an upload to the server of a node that was modified by a first client and is typically caused by a second client synchronizing at about the same time as the synchronization process of the first client is occurring.

The method thus also provides for detecting any reactive collision between corresponding modified nodes that were separately modified on two clients and which are being uploaded at about the same time. Again, the reactive collision is detected based upon the version identifiers associated with the nodes that are being uploaded. If a reactive collision is detected on the server, then the method causes the synchronization process to be repeated by one of the clients. During the repeated synchronization, a proactive collision is detected, so that the user of the one client is alerted to the problem.

More specifically, a reactive collision occurs during upload of a node by a second client after a first client has completed uploading of a corresponding modified node at about the same time as the second client. During the second client's upload, the server notices that the original version identifier of the node being uploaded by the second client is different than the server's current version identifier, which indicates to the server that a modified version of the node has been uploaded to the server since the time that the second client downloaded the node. The server then aborts the second client's upload process, and the second client is caused to restart the synchronization process so that the collision can be detected as a proactive collision and handled appropriately by the user of the second client.

Before each download of nodes from the server to the clients occurs, the version identifier for the class on the client is transferred to the server, since this version identifier indicates when the previous synchronization of the client with the server occurred. Any nodes for which the version identifier associated therewith indicates the node on the server is a later version than the corresponding node on the client are downloaded to the client. During the download, the method automatically overwrites each node that was not yet modified on the client, with a corresponding node downloaded from the server, and deletes each node on the client that is no longer on the server.

Each client preferably maintains a cache in which are stored the latest version of nodes most recently downloaded from the server. Each client also maintains a storage containing all nodes that have modified on the client, but not yet uploaded to the server.

If a proactive collision is detected on a client, a user can choose either to overwrite the modified node on the client with the corresponding node just downloaded from the server, or to upload any modified node from the client to the server, overwriting any corresponding node on the server. In a current preferred embodiment, the decision is made in regard to all proactive collisions identified during the current synchronization.

Another aspect of the present invention is directed to a memory medium having machine instructions for performing the steps generally as described above in regard to the method. Yet another aspect of the present invention is directed to a system for maintaining synchronization of data. The system includes a server computing device and client computing devices. The server computing device and each client computing device includes a memory in which machine instructions are stored and a processor that executes the machine instructions, carrying out functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Computer for Implementing the Present Invention

Figure 1:
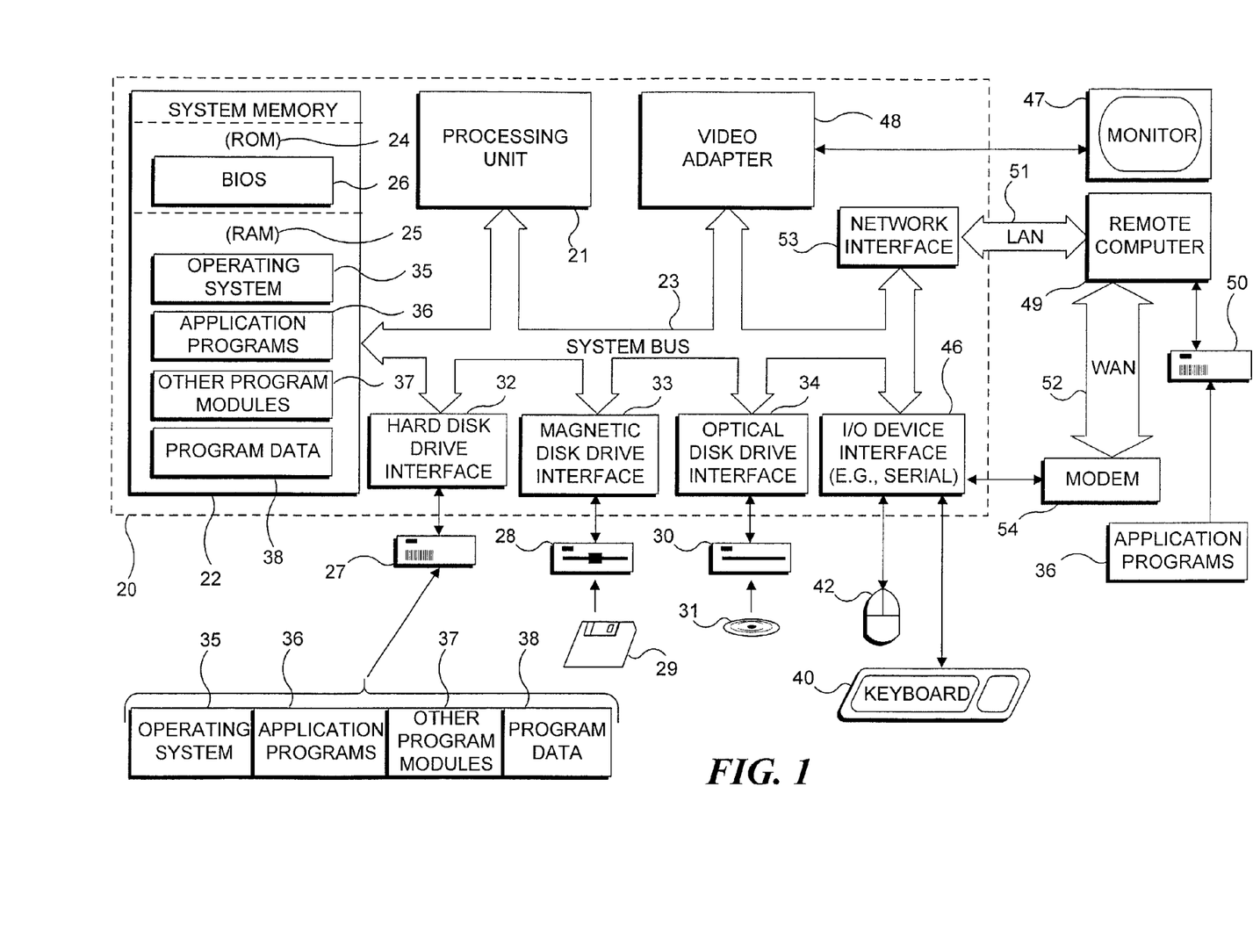
FIG. 1 is a functional block diagram of a generally conventional personal computer that is suitable for use as either the client or the server computing device for implementing the present invention.

FIG. 1 and the following discussion related thereto are intended to provide a brief, general description of a suitable computing environment in which the present invention may be implemented. This invention is preferably practiced using one or more computing devices functioning as a server, which are coupled to each client computing device or other remote computing device by a communications network. Both the server and the client computing devices will typically include the functional components shown in FIG. 1. Although not required, the present invention is described as employing computer executable instructions, such as program modules that are executed by the server and by the client computers to enable synchronization of data exchanged. Generally, program modules include application programs, routines, objects, components, functions, data structures, etc. that perform particular tasks or implement particular abstract data types. Also, those skilled in the art will appreciate that this invention may be practiced with other computer system configurations, particularly in regard to the client, including handheld devices, pocket personal computing devices, digital cell phones adapted to execute application programs and to wirelessly connect to a network, other microprocessor-based or programmable consumer electronic devices, multiprocessor systems, network personal computers, minicomputers, mainframe computers, and the like. As indicated, the present invention may also be practiced in distributed computing environments, where tasks are performed by one or more servers in communication with remote processing devices that are linked through a communications network. In a distributed computing environment, program modules may be located in both local and remote memory storage devices.

With reference to FIG. 1, an exemplary system for implementing the present invention includes a general purpose computing device in the form of a personal computer 20 that is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26 containing the basic routines that are employed to transfer information between elements within computer 20, such as during start up, is stored in ROM 24. Personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for personal computer 20. Although the exemplary environment described herein employs a hard disk, removable magnetic disk 29, and removable optical disk 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, or in ROM 24 or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input/output (I/O) devices are often connected to processing unit 21 through an I/O interface 46 that is coupled to system bus 23. The term I/O interface is intended to encompass interfaces specifically used for a serial port, a parallel port, a game port, a keyboard port, and/or a universal serial bus (USB), and other types of data ports. A monitor 47, or other type of display device, is also connected to system bus 23 via an appropriate interface, such as a video adapter 48, and is usable to display application programs, Web pages, and/or other information. In addition to the monitor, the server may be coupled to other peripheral output devices (not shown), such as speakers (through a sound card or other audio interface, not separately shown), and printers.

As indicated above, many aspects of the present invention are preferably practiced on a single machine functioning as a server; however, personal computer 20 will normally operate in a networked environment using logical connections to one or more remote computers, such as a remote computer 49, which may be one of the client computers exchanging data over the network. Remote computer 49 may alternatively be a server, a router, a network PC, a peer device, or a satellite or other common network node, and typically includes many or all of the elements described above in connection with personal computer 20, although only an external memory storage device 50 has been illustrated in FIG. 1. The logical connections depicted in FIG. 1 include a local area network (LAN)51 and a wide area network (WAN)52. Such networking environments are common in offices, enterprise wide computer networks, intranets, and the Internet.

When used in a LAN networking environment, personal computer 20 is connected to LAN 51 through a network interface or adapter 53. When used in a WAN networking environment, personal computer 20 typically includes a modem 54, or other means such as a cable modem, Digital Subscriber Line (DSL) interface, or an Integrated Service Digital Network (ISDN) interface, for establishing communications over WAN 52, which may be a private network or the Internet. Modem 54, which may be internal or external, is connected to the system bus 23 or coupled to the bus via I/O device interface 46; i.e., through a serial port. In a networked environment, program modules depicted relative to personal computer 20, or portions thereof, may be stored in the remote memory storage device. It will be appreciated that the network connections shown are exemplary and other means of establishing a communications link between the computers may be used, such as wireless communication and wideband network links.

Exemplary Application of the Present Invention

Although it should clearly be understood that the present invention is not in any way limited by the following example, an initial application, which clearly illustrates how it is applied, is described below. This example is particularly pertinent because the present invention solves a troublesome problem that would otherwise be experienced by users of client computers in a client-server network over which data are accessed. Specifically, the present invention was developed to address a problem regarding synchronization of data for electronic schoolwork or assignments. Microsoft Corporation's ECS is a client-server product for use in kindergarten through twelfth grade (K–12) schools for managing, distributing, collecting, and grading of assignments. Each assignment, which is a node of the data maintained by the ECS, may have an attached unit of educational content called a "learning resource" (LR). Teachers and students typically access the ECS server over a LAN or over the Internet using a conventional Web interface, such as Microsoft Corporation's Internet Explorer browser program. In addition, teachers access the ECS using the TC, as noted above. When connected to the network using the TC, a teacher can assign an assignment to students in the class directed by the teacher, and once the assignment is completed by the students, the teacher can grade each student's electronic work product online (while connected to the ECS server over a LAN or Internet connection), or while working offline (while disconnected from the LAN or Internet). In addition, the students can view their graded work over the network using their browser program.

To provide flexibility for this electronic class work paradigm, teachers periodically synchronize their TECS with the server and then may choose to work away from school. For example, while at school, the teacher can use a TC at the school to carry out modifications, or create assignments, or grade papers, or alternatively do the same work while connected to the server over the Internet, while at home. Furthermore, having downloaded data for existing assignments or other types of nodes related to a class, a teacher can also work offline, while not connected either to the intranet or to the Internet. When the teacher next connects the TC to the ECS over a network, the TC will synchronize by downloading modified nodes and any new nodes from the ECS and uploading to the ECS server any changes that might have been made to assignments or papers by the teacher.

The ECS system enables teachers to collaborate on the work for a class, which is important since two or more teachers may work at creating assignments for a specific class. Thus, for example, while working at home, a teacher may create an assignment while concurrently, a teaching assistant may be grading papers for another assignment at school. When either the teacher or the teaching assistant clicks a synchronize button in their respective TC, they will receive a download of any changes previously uploaded by the other in the data related to the class.

In order for the system described above to work properly, it is necessary to maintain synchronization between data modified on the ECS and changes made to data that have been downloaded or created on a plurality of TECS. The present invention ensures that data nodes, such as assignments and papers, are synchronized between the clients and the server and detects any collisions of the nodes that have been modified, for example, in the event that two individuals changed corresponding assignments or other kinds of nodes. To simplify and improve the performance of this synchronization process, the present invention is incremental, because it attempts to only require the transfer of data for information that is changed since a previous synchronization between the ECS and a TC last occurred.

For each school, the ECS maintains a collection of zero or more classes for which data related to assignments and papers are included. Each class (Cls) includes a collection of zero or more assignments, and information comprising an assignment (As) is called an "As node." In addition, each class typically has one or more teachers (it is contemplated that the present invention might also be applied to an electronic teaching paradigm that does not require any teacher be assigned to a class). Each teacher runs the TC software on a local copy or cache of the data for one or more classes that has been downloaded to the TC. This copy preferably includes the As nodes for each class that the teacher teaches. Periodically, a teacher uses the synchronization capability of the TC to first download from the ECS any modifications made by other teachers of the same classes, or made by the same teacher on another computer running the TC, and to upload modifications to the data made by the teacher on a TC to the ECS.

Figure 2:
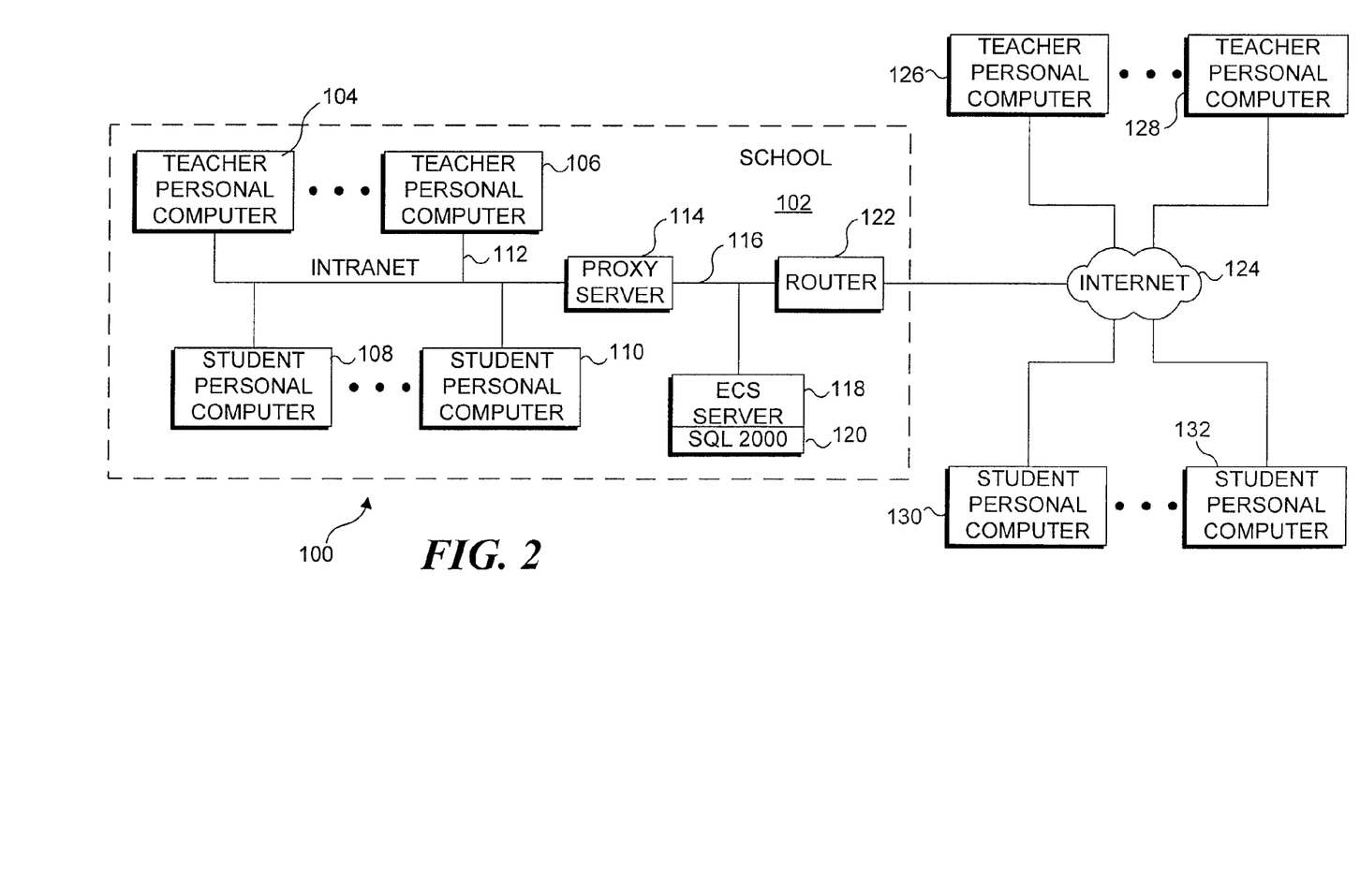
FIG. 2 is a functional block diagram of a first exemplary system on which the present invention is implemented.
Figure 3:
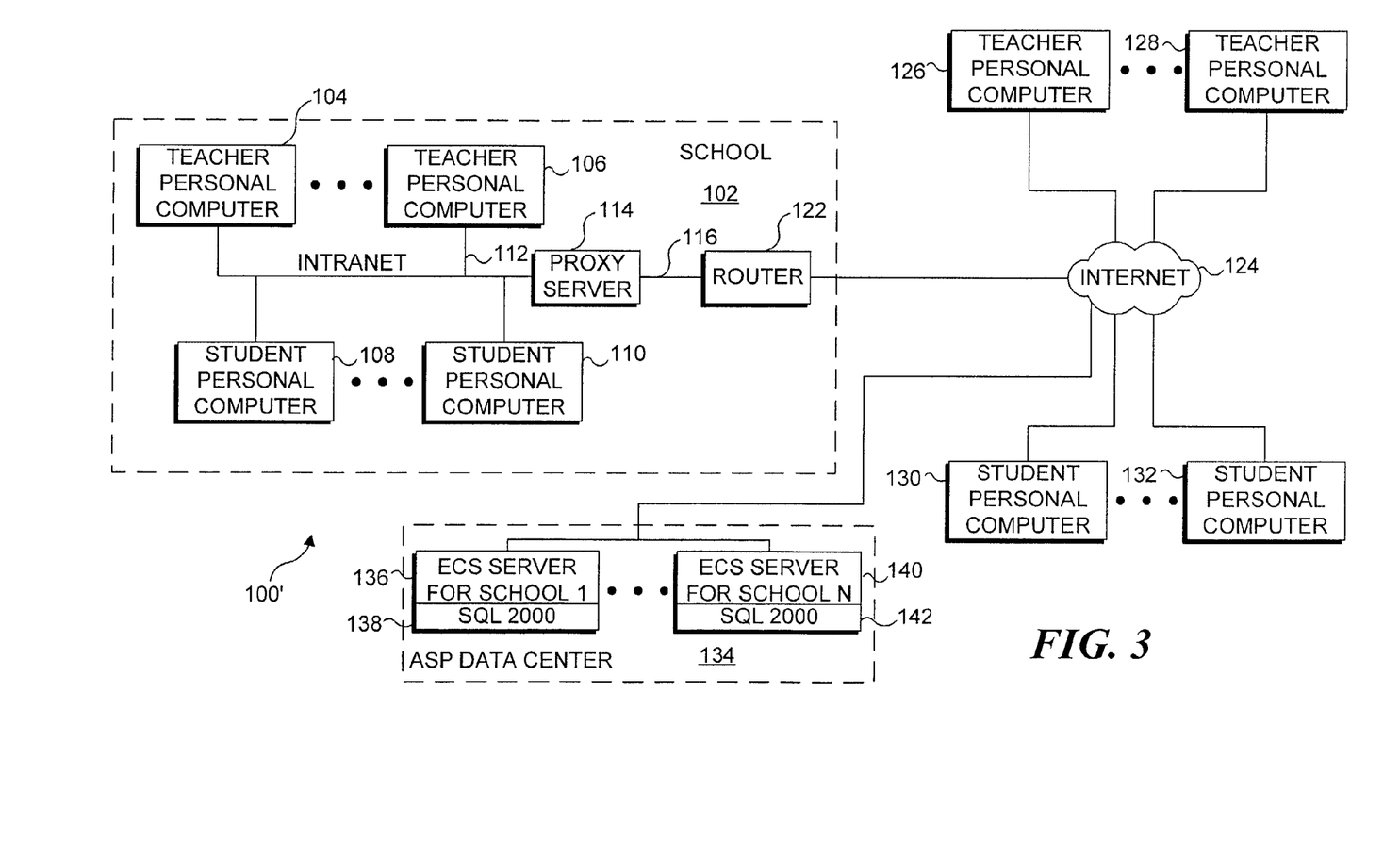
FIG. 3 is a functional block diagram of a second exemplary system on which the present invention is implemented.
Figure 4:
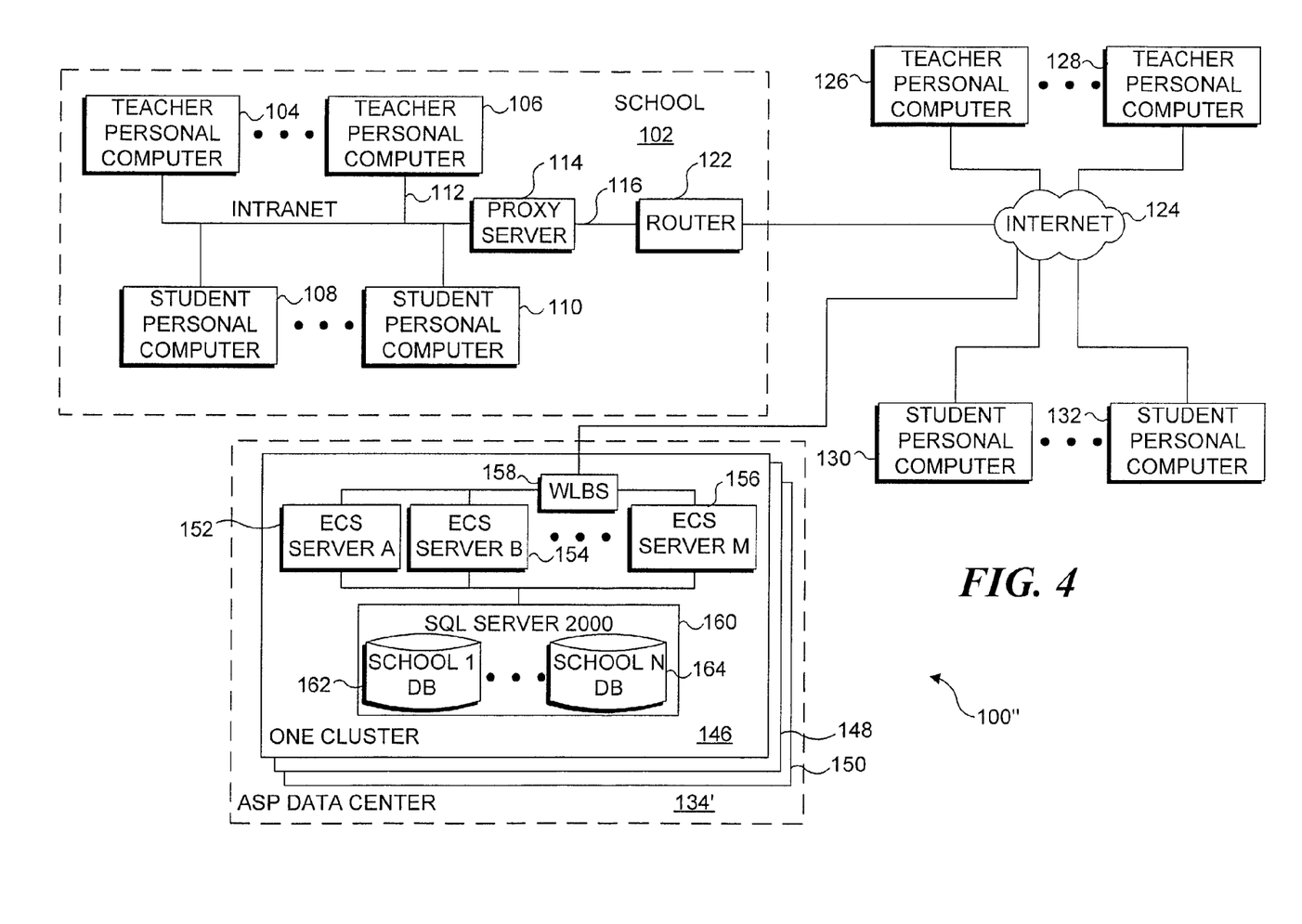
FIG. 4 is a functional block diagram of a third exemplary system on which the present invention is implemented.

FIGS. 2, 3, and 4 illustrate several different embodiments of network configurations in which the present invention is employed to maintain synchronization of data that is accessible at different locations by a plurality of different client computers. FIG. 2 illustrates a configuration 100 in which a school 102 includes a server computer 118 that runs both ECS and Microsoft Corporation's SQL Server 2000™ database program 120. A plurality of teacher personal computers 104 and 106 (only two shown) are connected to the server computer running ECS, over an intranet 112 through a proxy server 114. Proxy server 114 is coupled to the server computer running the ECS through an extranet 116. Also connected to the ECS via the intranet are a plurality of student personal computers 108 and 110. The student personal computers have the right to access but not change assignments and enable students to prepare electronic papers for submission to the teachers in response to the assignments provided by the teachers. A router 122 connected through extranet 116 to the server computer running the ECS is also coupled to Internet 124 so that data can be downloaded or uploaded from server computer 118 over Internet 124. Thus, at locations outside school 102, such as at their respective homes, teachers can use teacher personal computers 126 and 128 and students can use student personal computers 130 and 132 to access data stored on server computer 118 over Internet 124 and to upload data to the ECS on the server computer. An advantage of embodiment 100 is that teachers and students at school 102 can readily access and use the ECS without being connected to Internet 124. Although not shown in any of the embodiments of FIGS. 2–4, an administration personal computer, which is running the ECS Web based administrator user interface, enables information about teachers, students, and classes to be added, removed, or updated in the data stored on server computer running the ECS.

Referring to FIG. 3, an embodiment 100' illustrates a different configuration in which each school has a specific one of server computers 136–140 for running the ECS, but each of the server computers are maintained at an Application Server Provider (ASP) data center 134 separate from the school, so that the school doesn't have to maintain an ECS server. In this embodiment, teacher and students must always use a personal computer to connect to the ECS over Internet 124 (or some other external network) to access the data maintained by the ECS in the SQL 2000 database 138 of the school, regardless of whether the teachers and students are at home or at school 102. Thus, server computer 136 includes an SQL 2000 142 database to maintain the data for school 102, while server computer 140 includes another SQL 2000 database to maintain the data for a different school N. One advantage of this embodiment is that it is relatively easy for the ASP data center to set up the ECS for a specific school, but the embodiment does not scale up as additional schools are added, as well as embodiment 100.

In FIG. 4, an embodiment 100" is illustrated in which an ASP data center 134' divides the collection of schools that are served into clusters, with N schools per cluster. As shown in this example, a cluster 146 includes a server 152, a server 154, and a total of up to M servers, up through server 156 that execute the ECS. These servers are in turn connected to access N databases 162 and 164 running under SQL 2000 160. A Windows Load Balancing Server (WLBS) 158 is used to distribute requests for data directed to the ECS to selected ones of servers 152, 154, and 156, so that the data processing load is distributed among the collection of servers in cluster 146. Similarly, additional clusters 148 and 150 are also maintained at ASP data center 134', each cluster servicing a different one of up to N schools. It should be noted that each school's data are contained in a single one of databases 162–164, so that the data for each of the N schools are kept separate and not co-mingled. Also, the M servers running the ECS can be increased or decreased in value as needed, on the fly, based on demand. Any of these servers can thus service a request from any of the N schools, because the servers are totally stateless.

Figure 5:
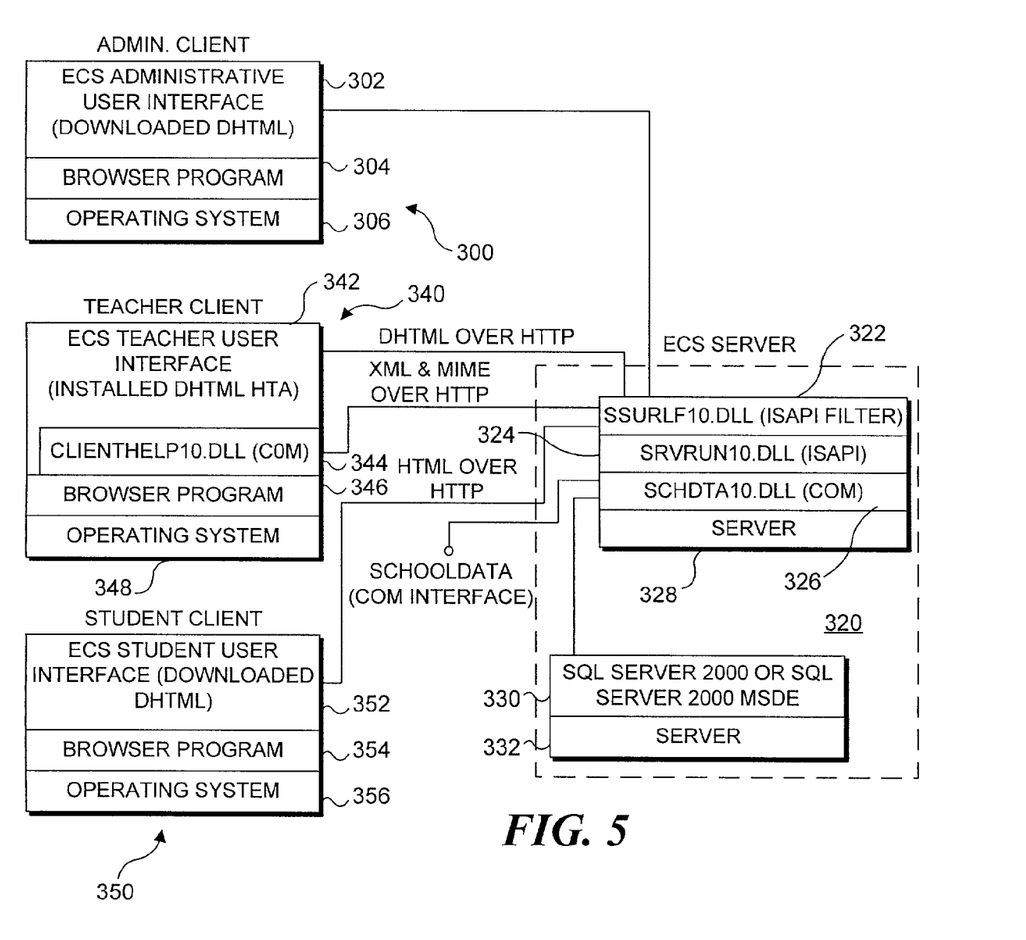
FIG. 5 is a functional block diagram illustrating the logical steps carried out when synchronizing the data on a client with the data stored on the server in accord with the present invention.

FIG. 5 illustrates the software modules that are employed on an administrative client 300, a TC 340, and a student client 350, all of which are coupled in communication with a server computer 320 on which the ECS is executed. Administrative client 300 includes an ECS administrative interface 302 downloaded as Dynamic Hypertext Markup Language (DHTML) over Hypertext Transport Protocol (HTTP) from the ECS. Also installed on the administrative client is a browser program 304, which typically operates in a graphic user interface operating system 306, such as Microsoft Corporation's Windows 95™ (or later) operating system.

TC 340 executes the ECS teacher user interface that is installed as a DHTML application 342 and which includes a clienthelp10.dll 344 (i.e., a dynamic link library) to provide help assistance to the TC application. The ECS teacher user interface communicates using DHTML over HTTP and the clienthelp10.dll module communicates with an Internet server application programming interface (ISAPI) filter 322 on the ECS, using XML and Multipurpose Internet Mail Extensions (MIME) over HTTP. Also coupled to this filter using HTML over HTTP is an ECS student user interface 352 that is on student client 350. The ECS student user interface is provided using downloaded HTML over HTTP. Teacher client 340 also includes a browser program 346 and preferably, has a graphic user interface operating system 348 like that on the administrative client.

Student client 350 also includes a browser program 354 and a graphic user interface operating system 356, which can be either a PC-compatible system or Apple Computer Corporation's Macintosh™ operating system, version 8.5 or later. The ECS on the server computer also includes an ISAPI module 324, a schdta10.dll 326, and a general server module 328. Schdta.dll module 326 is coupled to the SQL Server 2000 or a corresponding Microsoft Data Engine (MSDE) 330, which is under the control of server 332. Data are thus exchanged between the TECS (only one shown) and the student clients (only one shown) over the HTTP connection with the ECS using the modules included in server computer 320, as shown in FIG. 5.

Data Synchronization

There are two types of collision detection that must be performed to enable data on the ECS to be synchronized with data on the TECS. A data collision, which is sometimes called a "conflict" in other applications, occurs when an assignment (or other type of data node) is modified by two users, or by the same user on two different computers, and an attempt is then made to synchronize with the server running the ECS. When corresponding nodes of the data are thus changed by two or more clients and a synchronization causes a changed node to be uploaded to the server running the ECS, the resulting collision that occurs when another client attempts to synchronize must ultimately be resolved by a user. The two types of collisions, which are clearly explained below, are "a proactive collision" and "a reactive collision."

Figure 6:
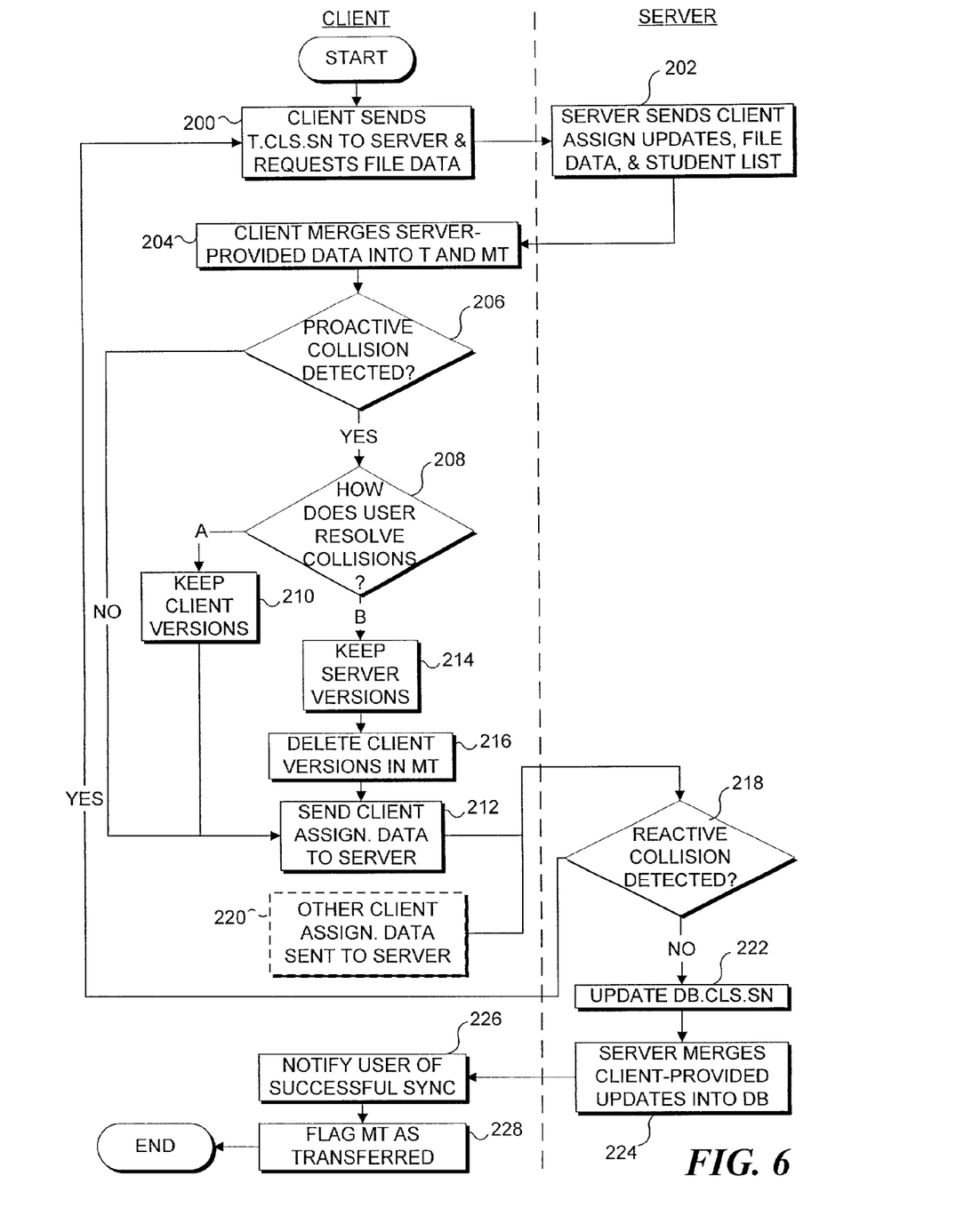
FIG. 6 is block diagram illustrating details of the functional software components employed on each client and the server of an exemplary system on which the present invention is implemented.

FIG. 6 illustrates the logical steps implemented in accordance with the present invention for maintaining synchronization of data for a single class. In the event that data for a plurality of classes must be synchronized, the steps illustrated in FIG. 6 will simply be repeated for each class, as necessary. FIG. 6 is divided by a vertical dash line that separates the steps that are carried out by the TC on the client computer, from those that are carried out on the server by the ECS. Once the synchronization process starts (e.g., when the teacher activates the synchronize button on the TC), at a step 200, the client sends a variable "TCls.SN" to the server to indicate the version identifier (or "sequence number") of the data (for that specific class) that the client currently has stored in its cache. At the time the system is initially set up, it is assumed that the client downloaded at least a first version of the data from the server and may have downloaded a number of updates, so that some version of the data on the server is already stored by TC in the cache on the client. In response to receiving this variable, in a step 202, the server sends the client assignment updates, file data, and a list of students currently in the class to which the data relates. (In a current embodiment, the TC synchronizes assignment node data first—in one iteration of the steps shown in FIG. 6, and then synchronizes file data—in a second iteration of FIG. 6.) More specifically, in this specific example, the server sends back to the client all DB.As nodes (assignments maintained in the database on the server) for which DB.As.SN (i.e., the version identifier for the assignment) is greater than the value received from the client for the variable T.Cls.SN. Accordingly, it should be apparent that only the assignment data that have been updated since the data were last downloaded from the server by the client need to be provided to the client to update its data to correspond to the data stored on the server. Also included in the data provided to the client by the server at this step is a list As IDs (i.e., unique assignment identifiers) of the DB.As nodes that currently exist on the server; but, this list is only provided if assignments have been deleted on the server since the class version number was T.Cls.SN. This list enables the client to determine which DB.As nodes have been deleted.

Upon receiving the data from the server, in a step 204, the client merges the server-provided data into cache T, which is a mirror of information maintained on the server, and also into client store MT, which contains all information that has been modified on the client. Both T and MT are stored on the client computer's hard disk, and are also maintained in memory while TC is running. During this step, the data for each DB.As node that is downloaded is copied into T, overwriting the T.As node if it already exists there. In addition, if an MT.As node has not been modified on the client since the last synchronization occurred (i.e., if it is not flagged as being "dirty"), then each such DB.As node is copied into MT, thereby overwriting a corresponding MT.As, if that assignment node already exists. Otherwise, only the "server attributes" (specific portions of assignment data that are never modified on the client, except during initial assignment creation) are copied to MT.As. Also, if the server provided a list of AsIDs for the assignment nodes that are currently on the server since the previous synchronization by this client, the ID list is compared to the current list of assignments on the client, and those client assignments that are not on the list provided by the server are deleted from the assignments maintained in the client's cache T. At this point, the client's data are synchronized to reflect all changes of the data that have occurred on the server since the last synchronization by this client with the server.

Next, the client determines if a proactive collision is detected in a decision step 206. A brief example should help in understanding how a proactive collision occurs. In this example, it will be assumed that both a first teacher and a second teacher have synchronized their TECS to the ECS by carrying out steps 200–228. During the synchronization, an assignment X is downloaded to the client computers of both the first teacher and the second teacher. It should be noted that the first and second teacher could actually be the same teacher at two different points in time, perhaps working at school in a first instance, and at home in a second instance. The first teacher edits the version of assignment X on the client computer, and the second teacher likewise edits assignment X on a different computer. Next, the first teacher carries out steps 200–228 to synchronize the TC on the client computer with the ECS, and in addition, uploads the modified version of assignment X to the server. Similarly, the second teacher subsequently executes steps 200, 202, and 204 to begin the process of synchronizing the TC with the ECS. However, upon receiving the data from the server in step 204, the TC on the second teacher's client computer recognizes that the assignment was modified on the server as a result of the first teacher's earlier uploading of the modified version of assignment X to the server since the time that the second teacher downloaded assignment X. Accordingly, if the second teacher uploads the modified version of assignment X that the second teacher created, it will collide with the modified version of assignment X that was created by the first teacher and which has already been uploaded to the server. As a result, in decision step 206, the TC for the second teacher determines that a proactive collision has been detected. This detection is carried out by having the TC compare the serial number or version identifier of assignment X that was modified by the first teacher, uploaded to the server. When the modified version of assignment X was uploaded to the server by the first teacher, the ECS on the server increments the serial number or version of the data on the server. Assignment X as modified by the first teacher will be downloaded to the second teacher, because it has a later version identifier than that of assignment X that was previously downloaded by the second teacher and modified by the second teacher. Specifically, since the DB.As.SN of assignment X as modified by the first teacher that was just downloaded is not equal to MT.As.SN for assignment X as modified by the second teacher, TC notifies that a proactive collision has occurred.

If a proactive collision is detected, a decision step 208 determines how the user has chosen to resolve the collision. (Currently, this decision is not enabled on a node-by-node basis, but instead, is applied to all proactive collisions that were determined in the current synchronization. However, the decision can be implemented on a node-by-node basis, for each proactive collision that is determined.) It should be noted that proactive collisions can be resolved in either of two ways. As indicated by a Path A leading to a step 210, the user may decide to keep the modified version in MT for an assignment identified as being involved in a proactive collision. Or alternatively, if following a Path B to a step 214, the user may decide to keep the version that was modified on the server and just downloaded, thereby overwriting the version that the user had modified in MT. In this case, as indicated in a step 216, the client versions of any node involved in a proactive collision that are in the MT on the client computer are deleted by overwriting with the corresponding versions that were modified on the server and were just downloaded. Following either step 210 or step 216 or as a result of a determination that a proactive collision was not detected, a step 212 calls for uploading the client assignment data to the server. This step corresponds to uploading any As node in MT that has been modified since the node was last updated (i.e., is flagged as being "dirty"), to the server. In addition, the client also sends the MT.As.SN, which identifies the serial number or version of the assignment that was in the client's MT. In an optional step 220, other client data can also be sent to the server including new-created assignments that were not previously downloaded from the server but have been produced by the teacher or other user of the client computer since the last upload of data.

A determination is made in a decision step 218 of whether a reactive collision has occurred. A reactive collision is detected if the value of MT.As.SN that was uploaded from the client in step 212 is not equal to the value of DB.As.SN for the data t on the server. In other words, decision step 218 determines if the modified data has a version identifier or serial number that is different than that of a corresponding assignment now stored on the server. The circumstances that lead to a reactive collision are somewhat rare as will be evident from the following example, which explains how a reactive collision between corresponding nodes of data can occur.

In this example of a reactive collision, both a first teacher and a second teacher synchronize their respective TECS at about the same time, causing an assignment Y to be downloaded to their respective computers. Thereafter, both the first teacher and the second teacher separately modify the version of Y that was just downloaded to their respective client computers. Both teachers then initiate synchronization with the server, to upload their respective changes to Y. In this case, both teacher's TCs complete steps 200–206 at about the same time, and no proactive collision is detected by either TC because Y has not been uploaded yet. Then, the first teacher's TC completes step 212, and the server successfully completes steps 218–224. Finally, the second teacher's TC attempts step 212, but in step 218, the server detects a collision, because the version identifier of the second teacher's version of Y is not the same as the version identifier of the version of Y currently stored on the server (which, of course, is the version of Y that was just uploaded by the first teacher's TC). Thus, the server notifies the second teacher's TC of a reactive collision, and in response, the second teacher's TC restarts the synchronization process at step 200—which this time results in a proactive collision being detected by the second teacher's TC, giving the second teacher the opportunity to resolve the collision, as discussed above.

It should be apparent that the decision about how to resolve a collision depends upon the relative authority of the person making the decision in regard to any newly downloaded node that is different than an earlier downloaded corresponding node that has been modified by the person. For example, a teaching assistant might be instructed never to override any data stored on the server with modifications made by the teaching assistant, since those modifications may have been made my a teacher who has greater authority to make changes in the data.

In the event that a reactive collision is not detected, which will most often be the case, in a step 222, the server updates or increments the value of DB.Cls.SN to indicate that a modification of the data stored on the server has occurred. Next, in a step 224, the server merges the updated assignments just received from the client into the database. A step 226 provides for notifying the user of the client computer that a successful synchronization has just been completed. Next, in a step 228, a flag is set in the client's MT to indicate that a synchronization successfully transferred any modified assignments or other types of node to the server, and the logic then terminates.

Several details further clarify how the present invention is preferably implemented. For example, the version identifier can start at any value, but preferably starts with the value of zero for data initially stored on the server that have not yet been modified on the server. As noted above, anytime that data are transferred from a client to the server, causing the data on the server to be modified, the version identifier (serial number) associated with the data on the server is then incremented, providing an indication that the version of the data on the server has changed. The newly uploaded data are then associated with the new version identifier. It should also be understood that each client computer maintains two separate memory storages, including the client cache storage T that includes data mirroring the data on the server at the last synchronization, and the client store MT that includes assignments or other types of data nodes that have been modified on the client but have not yet been uploaded to the server. The flag that was set in step 226 of FIG. 6 indicates to client store MT whether the modified nodes of the data have been transferred successfully to the server. The version number indicated by the serial number associated with the nodes of the data is important in the present invention, because it indicates a relative point on a timeline corresponding to when the nodes were updated on the server and the version of the nodes that were last downloaded from the server to the client. To avoid overflow, serial numbers are preferably represented as 64-bit integers.

Each object that is maintained on the server by the ECS, including classes, assignments, papers, students, etc., has a numerical identifier (ID) that is unique among all of the objects of that type, separate from its serial number (version identifier). The serial number associated with a particular ID for an object thus indicates the version of the object last downloaded to the client or last updated on the server following an upload from a client. The examples illustrating the synchronization of data discussed above have primarily discussed synchronization of assignments, but it should clearly be understood that other types of data nodes besides assignments can be synchronized in accord with the present invention.

While the above exemplary application of the present invention is intended for use in an educational application, involving a teacher or student who must connect with the ECS on a server computer, it must be emphasized that the present invention is not in any way limited to the type of data discussed in this exemplary application. Also, it should be emphasized that the invention is not limited to a client-server paradigm, but can also be implemented on a peer-to-peer network where data on one computing device must be maintained in synchronization with data on a different computing device to which it is coupled. The network connecting the two or more computing devices in a peer-to-peer relationship can be a LAN, WAN, and/or the Internet or other public network. In addition, the computing devices are not limited to conventional personal computers and servers. Instead, other types of computing devices, such as PDAs, can be employed for coupling to another computing device for uploading or downloading data that are maintained in synchronization, in accord with the present invention.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for maintaining synchronization of data stored on a server, where components of the data are discrete objects that are separately modifiable on clients that are coupled to the server over a network and wherein modification to the components of the data on the clients can be uploaded to the server, comprising the steps of:
    (a) associating a version identifier with the data, said version identifier being incremented each time that a change to any component of the data occurs on the server;
    (b) each time that a component of the data is modified on the server, assigning to the component the value of the version identifier that was current at the time the component was modified on the server, other of the plurality of components comprising the data, which were not then modified, retaining a version identifier previously assigned thereto; and
    (c) detecting a proactive collision between a component of the data just downloaded to any client and a modified version of said component that was previously downloaded and modified by a user on said client, as a function of the values of version identifiers associated with the component downloaded and the modified version of the component, causing an indication of the proactive collision to be provided to the user, enabling the user to resolve the proactive collision.

2. The method of claim 1, further comprising the step of detecting reactive collisions between corresponding components of the data that are concurrently uploaded to the server from a plurality of clients if uploading of a corresponding component by one client is completed before that by another client, detection of a reactive collision causing the step (c) to be repeated for the other client.

3. The method of claim 2, wherein each time that a reactive collision is detected, causing step (c) to be repeated for the other client results in a proactive collision being detected between the component on the server just uploaded by said one client and the corresponding component that was being uploaded by the other client.

4. The method of claim 1, wherein the step of detecting a proactive collision comprises the step of automatically determining if the value of the version identifier of the component of the data just downloaded is different than the value of the version identifier of the modified component.

5. The method of claim 1, wherein if there is an indication of that a proactive collision has occurred, the step of enabling the user to resolve the proactive collision comprises one of the steps of:
    (a) overwriting the modified version of the component with the component that was just downloaded; and
    (b) uploading the modified version of the component to the server, so that a corresponding component on the server that was changed since the previous version of the component was downloaded and subsequently modified by the user, is overwritten with the modified version.

6. The method of claim 1, further comprising the steps of:
    (a) enabling a new component of the data to be created on the client; and
    (b) enabling the new component to be uploaded to the server.

7. The method of claim 6, further comprising the step of maintaining on each client:
  (a) a server cache in which components most recently downloaded from the server are stored; and
  (b) a client store in which components of the data that have been modified on the client, but not yet uploaded to the server are stored.

8. The method of claim 1, wherein each time that a client connects in communication with the server, further comprising the steps of:
  (a) downloading from the server to the client, each component for which the version identifier of said component on the server is greater than that of a corresponding component on the client;
  (b) downloading an identification of each component of the data on the server, if a component has been deleted from the data on the server after the client was last synchronized with the server;
  (c) automatically overwriting each component on the client that has not been modified with a corresponding component that was downloaded from the server, if the version identifier for the component that was just downloaded is greater than that of the component already on the client; and
  (d) automatically deleting each component on the client that was deleted on the server since the client was last synchronized with the server.

9. The method of claim 1, further comprising the step of maintaining on the server a unique identification for each object comprising the data stored on the server.

10. The method of claim 1, further comprising the step of enabling the modifications to be made by a user to the components of the data on a client while the client is not coupled to the server over the network, the modifications being subsequently uploaded to the server while the client is then coupled to the server over the network.

11. A memory medium having machine instructions that are readable by a computing device, for performing the steps recited in claim 1.

12. A method for maintaining synchronization of data stored on a server, said data being accessible by a plurality of clients at times coupled in communication with the server and able to download the data to be modified and to upload changes to the data to the server, said data including a plurality of nodes, comprising the steps of:
  (a) assigning to the data a version identifier that is incremented each time any node of the data is modified on the server;
  (b) associating a value of the version identifier with each node, said value that is thereby associated corresponding to that of the version identifier then assigned to the data when the node was last modified on the server;
  (c) enabling nodes that have been modified on the server since said nodes were previously downloaded by any client, to be downloaded to said client;
  (d) enabling nodes that were downloaded from the server by any client to be modified on said client, producing modified nodes;
  (e) enabling the modified nodes to be uploaded from each client to the server;
  (f) detecting and providing an indication on each client of any proactive collision between a node that has just been downloaded from the server to the client and a corresponding node that was previously downloaded by the client and has been modified on the client, the proactive collision being detected as a function of the version identifiers associated with the node that has just been downloaded and the node that has been modified on the client;
  (g) detecting any reactive collision between corresponding modified nodes that were separately modified on two or more clients and which are being uploaded by the two or more clients, as a function of the version identifiers associated with the nodes that are being uploaded; and
  (h) if a reactive collision is detected in step (g), repeating steps (e)–(h).

13. The method of claim 12, wherein the step of detecting the reactive collision occurs when the server detects that the version identifier of a node being uploaded by a client is different than a corresponding node now on the server, indicating that another client completed uploading of the corresponding node now on the server while said client was uploading said node.

14. The method of claim 12, wherein before each download of nodes from the server to the clients occurs, further comprising the steps on each client, of:
  (a) conveying the version identifier for a class of nodes on the client to the server to indicate a version of the nodes in the class that were last downloaded from the server to the client;
  (b) sending any nodes on the server to client, for which the version identifier associated therewith indicates the node on the server is a later version than the version identifier of the class on the client; and
  (c) providing an indication of nodes remaining on the server if any node has been deleted on the server after the client was last synchronized with the server.

15. The method of claim 14, further comprising the step of automatically overwriting each node not yet modified on the client with a corresponding node downloaded from the server and deleting each node on the client that was indicated as having been deleted on the server.

16. The method of claim 12, further comprising the step of maintaining on each client:
  (a) a cache in which are stored a latest version of nodes most recently downloaded from the server; and
  (b) a storage containing all nodes modified on the client, but not yet uploaded to the server.

17. The method of claim 12, wherein if there is an indication of a proactive collision being detected on a client, further comprising the step of enabling a user to elect one of the steps of:
  (a) overwriting the modified node on the client with the corresponding node just downloaded from the server; and
  (b) upload the modified node to the server, overwriting the corresponding node on the server.

18. The method of claim 12, further comprising the step of enabling new nodes to be uploaded from any of the clients to the server.

19. The method of claim 12, wherein the step of enabling the nodes that were downloaded from the server by any client to be modified on said client includes the step of enabling the nodes to be modified while the client is not connected to the server.

20. A memory medium having machine instructions that are readable by a computing device, for performing the steps recited in claim 12.

21. A method for maintaining synchronization of data transferred between a storage computing device and a plurality of remote computing devices that are at times coupled in data communication with the storage computing device to enable modification of the data, said data including a plurality of nodes that can be independently modified, the method comprising the steps of:

(a) assigning an identifier to the data;

(b) changing the identifier each time that any node of the data is modified on the storage computing device so that the identifier indicates a version of the data that are currently stored on the storage computing device at that time;

(c) associating a value of the identifier with each node stored on the storage computing device, said value indicating the version of the data at the time when the node was last modified on the storage computing device, other of the plurality of nodes comprising the data, which were not then modified, retaining a version identifier previously assigned thereto;

(d) downloading a current identifier associated with the data and with each of the plurality of nodes being downloaded to any of the plurality of remote computing device that has requested transfer of any of the data from the storage computing device, for modification on the remote computing device, said current identifier for each of the nodes being downloaded being retained in association with the nodes that are downloaded to indicate a version of the nodes that were thus downloaded;

(e) enabling the nodes downloaded to be modified on any remote computing device having rights to do so;

(f) at each subsequent time that one of the plurality of remote computing devices to which the nodes were downloaded in step (e) is coupled in data communication with the storage computing device for synchronizing the data, transferring the version indicator associated with the data that are retained on said one of the plurality of remote computing devices to the storage computing device;

(g) while synchronizing the data, downloading from the storage computing device to said one of the plurality of remote computing devices, each node of the data for which the identifier associated with the node on the storage computing devices indicates that said node is a later version than indicated by the identifier associated with data previously downloaded from the storage computing device to said one of the remote computing devices, thereby updating the nodes on said one of the plurality of remote computing devices, but retaining any modified nodes;

(h) detecting whether a node just downloaded in step (g) was modified on the storage computing device since a time that said node was previously downloaded and then modified to produce a modified node on said one of the plurality of remote computing devices, by comparison of the identifiers associated with the corresponding nodes, and if so, providing an indication thereof to a user of said one of the plurality of remote computing devices;

(i) enabling modified nodes to be uploaded to the storage computing device, along with the identifiers associated with the modified nodes; and (j) detecting whether a newer modified node has been uploaded to the storage computing device before uploading of a modified node in step (i) is completed, and if so, repeating steps (h)–(j).

22. The method of claim 21, further comprising the step of enabling the user of said one of the plurality of remote computing devices to respond to said indication by electing one of the steps of:

(a) overwriting the modified node on said one of the remote computing devices with the node just downloaded; and (b) uploading the modified version to the storage computing device, thereby overwriting the corresponding node on the storage computing device with the modified node and causing a change in the identifier associated with the data on the storage computing device.

23. The method of claim 21, wherein during synchronizing, further comprising the step of downloading from the storage computing device to said one of the remote computing devices a list identifying all nodes on the storage computing device, if a node has been deleted on the storage computing device after any nodes were downloaded to said one of the remote computing devices from the server computing device, causing nodes that were deleted on the server computing device to also be deleted on said one of the remote computing devices.

24. The method of claim 21, wherein on each of the plurality of remote computing devices, further comprising the steps of:

(a) maintaining a cache for storing the nodes just downloaded from the storage computing device and the identifier associated with the nodes; and (b) maintaining a storage for each node that is modified on the remote computing device.

25. The method of claim 21, wherein during synchronization, any node that has not been modified on said one of the remote computing devices since a previous synchronization is automatically overwritten with a corresponding node downloaded from the storage computing device.

26. The method of claim 21, wherein the step of enabling the nodes that are downloaded from the storage device to be modified by any remote computing device having the rights to do so includes the step of enabling the nodes to be modified while the remote computing device is not connected to the storage device.

27. A memory medium having machine instructions that are readable by a computing device, for performing the steps recited in claim 21.

28. A system for maintaining synchronization of data, comprising:

(a) a server computing device;

(b) client computing devices that are able to couple in communication with the server computing device over a network, to download the data, modify the data, and upload changes in the data to the server computing device over the network;

(c) the server computing device and each client computing device comprising:

(i) a memory in which are stored machine instructions, the memory on the server computing device also storing the data, said data including a plurality of nodes, the memory on the client computing devices also separately storing nodes of the data downloaded from the server computing device and nodes that have been modified on the client computing device;

(ii) a processor that in is coupled to the memory, said processor on the server computing device executing the machine instructions, causing the processor on the server computing device to:

(1) assign a version identifier to the data, and increment the version identifier each time any node of the data is modified on the server computing device;

(2) associate a value of the version identifier with each node, said value that is thereby associated corresponding to that of the version identifier then assigned to the data when the node was last modified on the server computing device, other of the plurality of nodes comprising the data, which were not then modified, retaining a version identifier previously assigned thereto;

(3) in response to a download request from a client computing device, download to said client computing device nodes that have been modified on the server computing device since said nodes were previously downloaded to the client computing device;

(4) in response to an upload request from a client computing device, upload modified nodes from the client computing device to the server computing device over the network; and (5) detect any reactive collision between corresponding modified nodes that were separately modified on two or more client computing devices and which are being uploaded by the two or more client computing devices at substantially the same time, as a function of the version identifiers associated with the nodes that are being uploaded; and (iii) wherein said processor on each client computing device executes the machine instructions stored in its memory, causing the processor on the client computing device to:

(1) selectively download from the server computing device nodes that have been modified on the server computing device since said nodes were previously downloaded to the client computing device;

(2) enable a user to modify nodes on the client computing device, producing the modified nodes;

(3) enable nodes that were downloaded from the server computing device by any client computing device to be modified on said client computing device, producing modified nodes;

(4) selectively upload modified nodes from any client computing device to the server computing device over the network; and (5) detect and provide an indication on each client computing device of any proactive collision between a node that has just been downloaded from the server computing device to the client computing device and a corresponding node that was previously downloaded by the client computing device and has been modified by a user on the client computing device, the proactive collision being detected as a function of the version identifiers associated with the node that has just been downloaded and the node that has been modified on the client computing device.

29. The system of claim 28, wherein machine instructions cause the processor of the server computing device to detect the reactive collision when the version identifier of a node being uploaded by a client computing device is different than a corresponding node now on the server computing device, indicating that another client computing device completed uploading of the corresponding node now on the server computing device while said client computing device was uploading said node.

30. The system of claim 28, wherein before each download of nodes from the server computing device to the client computing devices occurs, the machine instructions executing on the processor of the client computing device cause:

(a) the version identifier for the data on the client computing device to be conveyed to the server computing device, to indicate a version of the nodes that were last downloaded from the server computing device to the client computing device;

(b) request download to the client computing device of any nodes on the server computing device for which the version identifier associated with the node indicates that the node on the server computing device is a later version than the corresponding node on the client computing device; and (c) request download of an identification of each node on the server computing device, if any node was deleted from the server computing device since data were last downloaded from the server computing device to the client computing device for purposes of synchronization.

31. The system of claim 30, wherein the machine instructions executed by the processor on each client computing device further cause said processor to automatically overwrite each node not yet modified on the client computing device with a corresponding node downloaded from the server computing device and to delete each node on the client computing device that has been deleted and is no longer on the server computing device.

32. The system of claim 28, wherein if a client computing device detects a proactive collision, the machine instructions stored in the memory of the client computing device cause the processor of the client computing device to enable a user to selectively cause the client computing device to do one of:

(a) overwrite the modified node on the client computing device with the corresponding node just downloaded from the server computing device; and (b) upload the modified node to the server computing device, overwriting the corresponding node on the server computing device.

33. The system of claim 28, wherein the machine instructions executing on the processor of each client computing device enable a user to create a new node and to upload the new node to the server computing device when the client computing device is next synchronized with the server computing device.

34. The system of claim 28, wherein the machine instructions executed by the processor of the client computing device to enable modification of the nodes while the client computing device is not connected to the server computing device.

* * * * *

UNITED STATES PATENT AND TRADEMARK OFFICE
CERTIFICATE OF CORRECTION

| | |
|---|---|
| PATENT NO. | : 7,032,033 B1 |
| APPLICATION NO. | : 09/997801 |
| DATED | : April 18, 2006 |
| INVENTOR(S) | : Eric Ledoux et al. |

It is certified that error appears in the above-identified patent and that said Letters Patent is hereby corrected as shown below:

Title Page;

On the face page, in field (56), under "Other Publications", in column 2, line 8, after "Applications" delete "," and insert -- Conference, --, therefor.

On the face page, in field (74), under "Attorney, Agent, or Firm", in column 2, line 1, delete "Robert" and insert -- Ronald --, therefor.

In column 6, line 26, delete "(LAN)51" and insert -- (LAN) 51 --, therefor.

In column 6, line 27, delete "(WAN)52" and insert -- (WAN) 52 --, therefor.

In column 7, line 1, delete "Explorer" and insert -- Explorer™ --, therefor.

In column 14, line 52, in Claim 5, delete "of" before "that".

Signed and Sealed this

Twenty-third Day of March, 2010

David J. Kappos
*Director of the United States Patent and Trademark Office*